United States Patent
McNulty (10) Patent No.: US 8,958,610 B2
(45) Date of Patent: Feb. 17, 2015

(54) SYSTEM, METHOD AND APPARATUS FOR SENSING BIOMETRIC INFORMATION

(76) Inventor: Scott McNulty, Rowayton, CT (US)

(*) Notice: Subject to any disclaimer, the term of this patent is extended or adjusted under 35 U.S.C. 154(b) by 594 days.

(21) Appl. No.: 13/181,940

(22) Filed: Jul. 13, 2011

(65) Prior Publication Data

US 2012/0013724 A1    Jan. 19, 2012

Related U.S. Application Data

(60) Provisional application No. 61/365,605, filed on Jul. 19, 2010, provisional application No. 61/368,065, filed on Jul. 27, 2010.

(30) Foreign Application Priority Data

Jul. 13, 2010   (IE) .................................. S2010/0430

(51) Int. Cl.
   *G06K 9/00*   (2006.01)

(52) U.S. Cl.
   CPC ............ *G06K 9/0012* (2013.01); *G06K 9/0004* (2013.01)
   USPC ............ 382/124; 382/115; 382/116; 382/125

(58) Field of Classification Search
   USPC .................. 382/115, 116, 124–127
   See application file for complete search history.

(56) References Cited

U.S. PATENT DOCUMENTS

| | | | |
|---|---|---|---|
| 6,411,728 B1 | 6/2002 | Lee et al. | |
| 6,591,002 B2 * | 7/2003 | Lee et al. | 382/125 |
| 7,362,888 B2 | 4/2008 | Abiko | |
| 7,394,919 B2 | 7/2008 | Rowe et al. | |
| 7,505,613 B2 * | 3/2009 | Russo | 382/124 |
| 7,801,339 B2 | 9/2010 | Sidlauskas et al. | |
| 7,835,554 B2 | 11/2010 | Rowe | |
| 7,848,798 B2 | 12/2010 | Martinsen et al. | |
| 7,953,256 B2 | 5/2011 | Dias | |
| 8,265,352 B1 * | 9/2012 | Neoh et al. | 382/124 |
| 2007/0003114 A1 | 1/2007 | Hendriks et al. | |
| 2008/0166029 A1 | 7/2008 | Presura | |
| 2008/0298649 A1 | 12/2008 | Ennis et al. | |
| 2011/0279679 A1 * | 11/2011 | Samuel et al. | 348/162 |

OTHER PUBLICATIONS

Menzel, Recent Advances in Photoluminescence Detection of Fingerprints, The Scientific World (2001) 1, 498-509.*
Menzel, Fingerprint detection with lasers, 2nd edition, 1999, chaper 3 and chapter 5, 57 pages.*
NPL—Samuel et al., WO 2010/064034, "Apparatus and Method for Obtaining an Image of a Fluorescent Pattern Under Ambientlight". Published Jun. 10, 2010, 37 pages.*

* cited by examiner

*Primary Examiner* — Wesley Tucker
(74) *Attorney, Agent, or Firm* — Locke Lord LLP (57) ABSTRACT

An apparatus, method and system are provided for sensing at least one biometric measure of an individual. A low voltage pulsed electrical charge is applied to a transparent electrode plate, which is dimensioned to receive a portion of an individual's dermal surface having molecules associated therewith. The pulsed electrical charge stimulates and excites the molecules and causes molecular compounds to fluoresce. An image of the fluoresced dermal surface is obtained and a biometric function is performed with data derived from the image.

16 Claims, 6 Drawing Sheets

SYSTEM, METHOD AND APPARATUS FOR SENSING BIOMETRIC INFORMATION

CROSS-REFERENCES TO RELATED APPLICATIONS

This application claims the benefit of Irish Short-Term Patent Application No. S2010/0430 filed Jul. 13, 2010 entitled "Finger Sweat Gland Biometrics," U.S. Provisional Patent Application No. 61/365,605 filed Jul. 19, 2010 entitled "System, Method and Apparatus For Determining An Individual's Identity Using Unique Biometric Characteristics," and U.S. Provisional Patent Application No. 61/368,065 filed Jul. 27, 2010 entitled "System, Method and Apparatus For Generating A Biometric Based On The Random Locations Of Sweat Pores On Skin."

FIELD OF THE INVENTION

The present invention relates to a system, method and apparatus for sensing biometric information. More specifically, the present invention relates to a system, method and apparatus for detecting and analyzing an individual's sweat pores as an identification, authentication and/or liveness biometric measure.

BACKGROUND

Biometric identification systems use sensor technologies to obtain information regarding an individual's unique physical characteristics and compare the obtained information with verified reference information to confirm the identity of the individual. Known biometric identification systems have used optical, thermal, capacitive, impedance, radio-frequency, conductance and ultrasonic based sensors for detecting biometric information.

Physical characteristics that are commonly used for biometric identification include unique features from an individual's face, iris, hand geometry, vein pattern, palm and fingerpads. The most predominantly used physical characteristics for biometric identification are the minutiae or macrofeatures found on the dermal surface of an individual's fingerpad. For example, an individual's fingerpad is covered with a pattern of ridges and valleys commonly referred to as a fingerprint. Each fingerprint scan contains about 30 to 40 minutiae and macrofeatures which are unique biometric identification characteristics. The dermal surface of an individual's finger also has between 50 and 300 sweat pores located on the fingerprint ridges. Like an individual's fingerprint, the number and locations of sweat pores on an individual's fingerpad do not change and provide unique biometric identification characteristics. Moreover, the locations of an individual's sweat pores relative to the fingerprint minutiae or macrofeatures provides an additional biometric identification measure.

The common traits to biometric identification measures are their permanence and uniqueness. However, these basic traits also make the biometric identification systems vulnerable to spoofing. Spoofing is the act of using an artificial biometric sample (such as a "fake finger") containing a replica of an authorized individual's fingerpad to enable an unauthorized individual to gain access to a secured system. Spoofing may also be used to enable an individual to pass himself off as another individual at a security checkpoint. Typically, the replicated fingerpad is formed of a synthetic material such as gelatin (including gummi which is obtained by gelling aqueous solution of gelatin), silicone, epoxy, latex and the like.

Anti-spoofing systems typically are designed to detect the liveness of the physical sample presented to the biometric detection sensor. Most of these systems involve relatively large sensors which are unacceptable for mobile or portable devices. In addition, anti-spoofing systems are typically directed to detecting a liveness measure of the finger such as finger surface resistance, temperature, pulse, moisture, and blood oximetry. These systems, however, can be circumvented because they operate by comparing the detected liveness measure value to a predetermined acceptable range. Namely, it is possible to design an artificial biometric sample which produces a detected liveness measure within a known acceptable range. For example, artificial biometric samples can be made of materials with electrical properties resembling that of a living finger and which yield a biometric liveness measure within a given acceptable range.

Therefore, it would be beneficial to provide a biometric identification system based on the detection and analysis of both permanent and variable unique physical characteristics so as to provide identification, authentication and/or proof of a live biometric sample.

SUMMARY OF THE INVENTION

An objective of the invention is to provide an apparatus, method and system for biometric sensing based on the application of a low-voltage, variable frequency pulsed electrical charge to stimulate and excite the molecules associated with an individual's dermal surface and cause compounds contained within the molecules to fluoresce.

A further objective of the present invention is detecting the locations of sweat pores on an individual's dermal surface by exciting and fluorescing molecules on the dermal surface as well as within the sweat glands associated with the sweat pores.

Another objective of the invention is performing a biometric function, such as biometric identification or authentication based on the detection and analysis of sweat pores data derived from an image of fluoresced molecular compounds associated with an individual's dermal surface. The detected sweat pore information is compared to reference sweat pore information such that biometric identification or authentication is based on a determination whether there is an acceptable percentage of number of matching sweat pores and absence of false detected sweat pores.

Another objective of the invention is an apparatus, method an system for establishing proof of liveness of a biometric sample based on the detection and analysis of an individual's sweat pores. A first proof of liveness is provided by the capture of an image derived from the individual's dermal surface having fluoresced biological points identifying active sweat pores. A second proof of liveness is provided by the detection of sufficient minimal variation in the size, shape, intensity or brightness of the fluoresced biological points of the detected sweat pores and reference sweat pore information.

Yet another objective of the invention is a biometric identification or authentication based on the detection and analysis of an individual's fingerprint and sweat pores.

A further objective of the present invention is a sweat pore biometric identification system comprising a portable biometric detection apparatus and a remote central database containing reference sweat pore information.

DESCRIPTION OF DRAWINGS

These and other aspects of the invention will be described with reference to the drawings, in which.

DETAILED DESCRIPTION OF THE INVENTION

Figure 1:
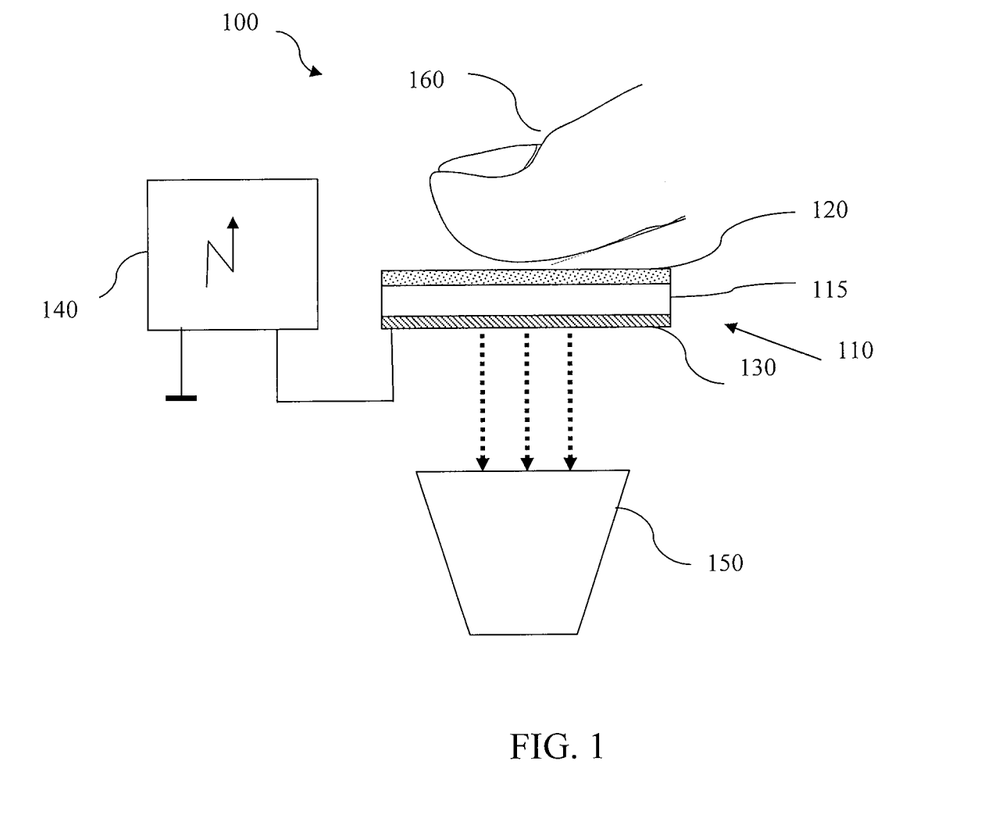
FIG. 1 is a schematic diagram of a sweat pore biometric detection apparatus according to an embodiment of the present invention.

FIG. 1 is a schematic diagram illustrating an embodiment of the present invention for biometric identification and proof of liveness based on the detection and analysis of sweat pores on an individual's fingerpad. As shown in FIG. 1, the biometric identification apparatus comprises an electro-magnetic field generator 140, a transparent electrode 110, and an image capture device 150. Electro-magnetic field generator 140 is configured to generate a low voltage, variable frequency pulsed electrical charge when an individual's finger is placed in the proximity of the top surface of transparent electrode 110. The electro-magnetic field generator 140 is configured to generate an electrical charge within a range of about 1 to 25 volts and at pulsed intervals within a range of about 1 to 10 or more pulses a second, with each pulse having a duration of about 1 microsecond ($10^{-6}$ seconds). It will be understood that the electro-magnetic field generator may be calibrated to produce different electric charges falling within these specified ranges. For example, the electro-magnetic field generator may be configured to generate an electrical charge of from about 15 to 25 volts at pulsed intervals of about 1 to 2 pulses per second. By way of further example, the electro-magnetic field generator may be configured to generate an electrical charge of from about 7 to 15 volts at pulsed intervals of about 2 to 4 pulses per second. Alternatively, the electro-magnetic field generator may be configured to generate an electrical charge of from about 1 to 6 volts at pulsed intervals of from 5 to 10 or more pulses per second. In a preferred embodiment, the electro-magnetic field generator is configured to generate an electrical charge of about 1 to 2 volts at pulsed intervals of from about 7 to 10 pulses per second.

Transparent electrode 110 may comprise a transparent glass substrate 115 having a transparent current conductive coating layer 130 on its bottom surface. In addition, the top surface of the transparent electrode 110 is dimensioned to receive the individual's fingerpad and may be coated with a transparent polymer material 120 to prevent electrical charge from being transmitted to the individual's fingerpad.

Figure 2:
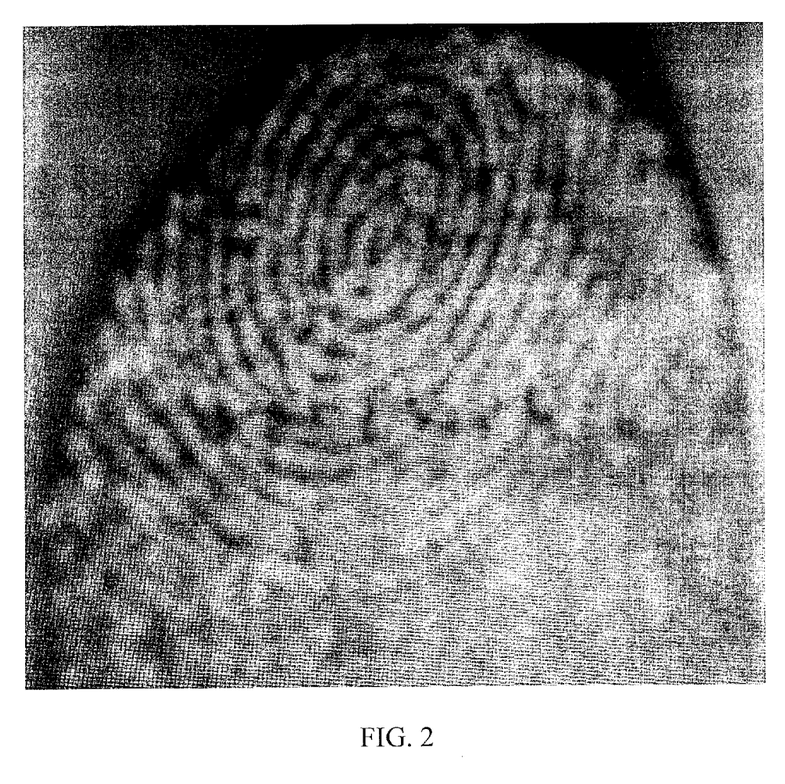
FIG. 2 is an exemplary illustration of a fingerpad image produced according to the present invention.

Without wishing to be bound by any scientific theory and explanation, applicant believes that the pulsed electrical charge provided by the electro-magnetic field generator 140 stimulates and excites molecules associated with complex metabolic waste substances (such as sweat gland amino acid molecules), loosely bound atmospheric water vapor residing on the dermal surface of an individual's fingerpad, and other materials including atomic oxygen. This, in turn, causes compounds adjacent to the ions within the excited molecules to become visible or fluoresce. It is further believed that the fluoresced molecules travel along the dermal surface to open sweat pores because the high levels of salt, water and amino acid in the sweat glands provides a superior grounding path for the ions. As shown in FIG. 2, this yields visible points or points of fluorescence which correspond with the locations of sweat pores on the individual's fingerpad.

Image capture device 150 is configured to capture an image of the fluoresced biological points representing the locations of the sweat pores on the fingerpad placed in the proximity of the transparent electrode 110. Image capture device 150 may comprise a solid state camera such as a computer controlled CCD array camera configured to capture real-time visualization of the fingerpad image or a spectrophotometer. It will be understood that the image capture device may alternatively capture a negative of the image, thereby representing the biological points as black points on a white background.

The electro-magnetic field generator and/or image capture device may be adapted to capture an image containing fluoresced points identifying the sweat pores or both a fingerprint pattern and fluoresced points identifying the sweat pores. For example, it will be understood that the resolution of the image capture device 150 and/or the voltage, rate and/or duration of the pulsed electrical charge provided by the electro-magnetic field generator 140 may be modified to capture an image of only the fluoresced points on the fingerpad or both the fingerprint and fluoresced points on the fingerpad. Capture of the fingerprint image does not require an external light source reflected on the fingerpad because the fingerprint is illuminated by the fluorescence of the excited molecules caused by the pulsed electrical charge provided by electro-magnetic field generator 140.

Alternatively, light impulses, acoustic pressure and/or vibration techniques may be used alone or in combination with the low voltage, variable frequency pulsed electronic charge to stimulate and excite the molecules on the dermal surface, and cause the compounds adjacent the ions within the excited molecules to fluoresce. In addition, it will be understood that the exemplary apparatus illustrated in FIG. 1 may be configured to capture and analyze image data from any dermal surface having sweat pores with associated molecules suitable for stimulation, fluorescence and image capture, including multiple fingerpads and palms or any portions thereof.

Figure 3:
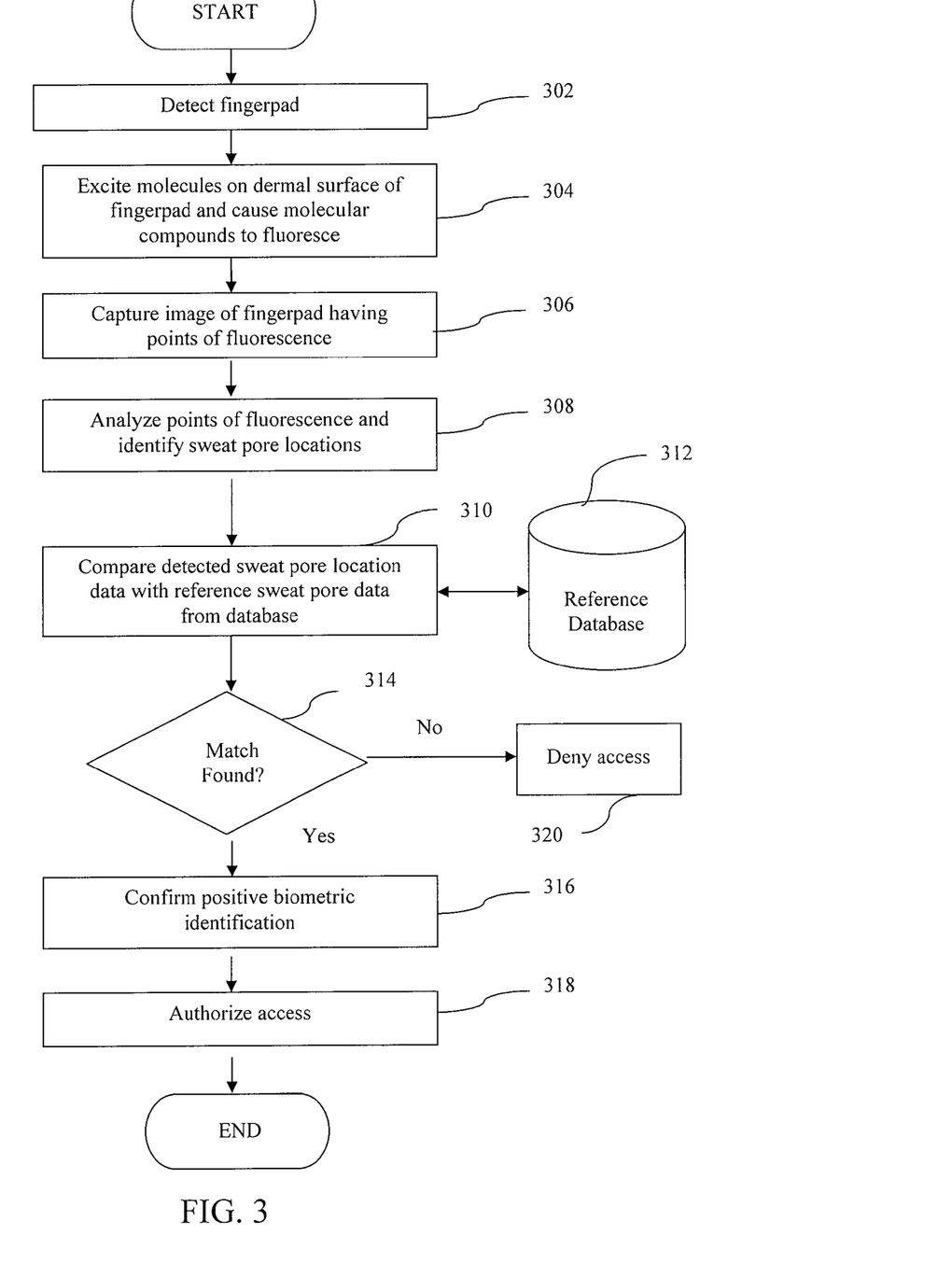
FIG. 3 is a flowchart illustrating an exemplary process for the detection and analysis of sweat pores for biometric identification according to the present invention.

In one embodiment of the invention, the biometric identification system is designed to detect sweat pores, independent of any other feature of the dermal surface such as a fingerprint. FIG. 3 is a flowchart illustrating an exemplary process for detecting and analyzing sweat pores in accordance with the invention. The process shown in FIG. 3 may be implemented in a biometric identification and proof of life system using, for example, the apparatus shown in FIG. 1.

The process begins when the sweat pore biometric identification system detects a fingerpad on the top surface of a transparent plate (step 302). For example, sweat pore biometric identification apparatus 100 detects fingerpad 160 on the top surface of transparent electrode plate 110 in FIG. 1. Subsequent to detecting the fingerpad on the transparent plate in step 302, the electro-magnetic field generator 140 provides a pulsed electrical charge to stimulate and excite molecules associated with the dermal surface of the fingerpad and, thereby, cause compounds adjacent ions within the molecules to fluoresce (step 304). Then, the sweat pore biometric system uses an image capture device 150 (e.g., a CCD array camera) to obtain an image of the fingerpad derived from the fluoresced biological points, such as the fingerpad image shown in FIG. 2 (step 306). The capture of an image derived from the dermal surface having fluoresced biological points constitutes proof of liveness since only a living being is capable of providing such fluoresced biological points. The apparatus may include a controller (not shown) configured to interface with electro-magnetic field generator 140 and image capture device 150 and coordinate the detection of the fingerpad, application of the pulsed electrical charge and image capture of the fluoresced biological points on the fingerpad.

Next, the sweat pore biometric identification system analyzes the fluoresced biological points on the image (step 308) and uses an algorithm to compare the biometric information obtained from the image with reference biometric information stored in a repository, such as Reference Database 312 (step 310). The step of analyzing the fluoresced biological points may be performed by the sweat pore biometric identification apparatus 100 or a separate device (e.g., a secure network server or a local computer device) coupled in communication with apparatus 100. Similarly, the step of comparing the biometric information obtained from the captured image with the biometric information stored in a repository may be performed by the sweat pore biometric identification apparatus 100 or a separate device coupled in communication with apparatus 100. Reference Database 312 may be maintained on the apparatus, a local storage device or a remote storage device. For security purposes, communications within the sweat pore biometric identification system (e.g., between Apparatus 100 and Reference Database 312) are preferably encrypted. For this same reason, data stored on Reference Database 312, Apparatus 100 or any other device used in the sweat pore biometric identification system is preferably encrypted. Accordingly, apparatus 100 comprises cryptographic capabilities for encrypting transmitted communications, decrypting received encrypted communications and encrypting stored data.

Step 308 of analyzing the fluorescent biological points depicted on the captured image may include converting the visual information to a digital format. This may be done by any of a number of different techniques, including gray-scale analysis wherein a two-dimensional gray scale matrix is created by assigning gray-scale values for each pixel in the captured image. By way of example, the gray-scale values may span a range from 0 to 255 with 0 corresponding to black and 255 corresponding the brightest or most intense fluorescence of the biological points on the captured image. The gray-scale matrix may then be used to map the location, size and intensity of each detected sweat pore on the fingerpad image. Various known techniques may be used to extract this sweat pore information from the gray-scale matrix, including noise reduction, contrast enhancement, binarization, thinning, healing and feature extraction. For example, the data generated from the captured image may be filtered to decrease the effect of noise captured on the image. This gray-scale matrix data may be encoded in a biometric barcode as explained in more detail below.

After comparing the detected sweat pore biometric information with the stored reference biometric information, a determination is made as to whether the detected sweat pore biometric information matches an entry on the reference database (step 314). If no match is found (no output of step 314), the process proceeds to step 320. If a match is found (yes output of step 314), the process proceeds to step 316 where an indicator is provided confirming a positive biometric identification. Such an indicator is an optional feature of the illustrated process and may include a visual display and/or an audio signal. The process then proceeds to step 318 where the biometric identification system authorizes access to a secure area or device.

The process of comparing the sweat pore information from the captured image with the stored reference sweat pore information may involve matching the locations of detected sweat pore with reference sweat pore locations. For example, the number or percentage of matches may be measured by a correlation score. The correlation score may also take into account the number or percentage of false detected sweat pores (i.e., instances where there is no reference sweat pore location which corresponds to a detected sweat pore location). The correlation score is compared with a predetermined standard score for determining whether the detected biometric information matches the reference biometric information.

The sweat pore biometric identification system of the present invention may also be used to provide a second proof of liveness measure. Not only are an individual's sweat pores a fixed biometric in the sense that their locations remain unchanged throughout the individual's life, but they also can be considered as proof of liveness because the amount and composition of complex metabolic waste substances contained in sweat secreted from an individual sweat gland and the degree to which each sweat pore is open (or even closed altogether) varies depending on certain conditions, including the prevailing emotional and/or physical state of the individual. Nerve fibers associated with an individual's sweat glands function to control the degree to which a sweat pore is open or even closed and the amount and composition of the sweat secreted from or contained within the sweat glands based on an individual's emotional state. For example, an individual's prevailing level of excitement, anxiety or fear may cause the nerve fibers to activate the sweat glands to secrete varying amounts of sweat. In addition, these nerve fibers may also cause an individual's sweat pores to open to varying degrees or even close in response to an individual's emotional state. In contrast, the lack of any detectable variation of the sensed biological points identifying the sweat pores is an indication of a spoofing attempt. This is because over time, there will necessarily be at least some minimal variation in the sensed biological points of a living being and identical or essentially identical repeated detection of these sensed biological points would indicate an artificial non-living biometric sample. Accordingly, an analysis of the variation of an individual's sweat pores can be used as a proof of liveness.

Figure 4:
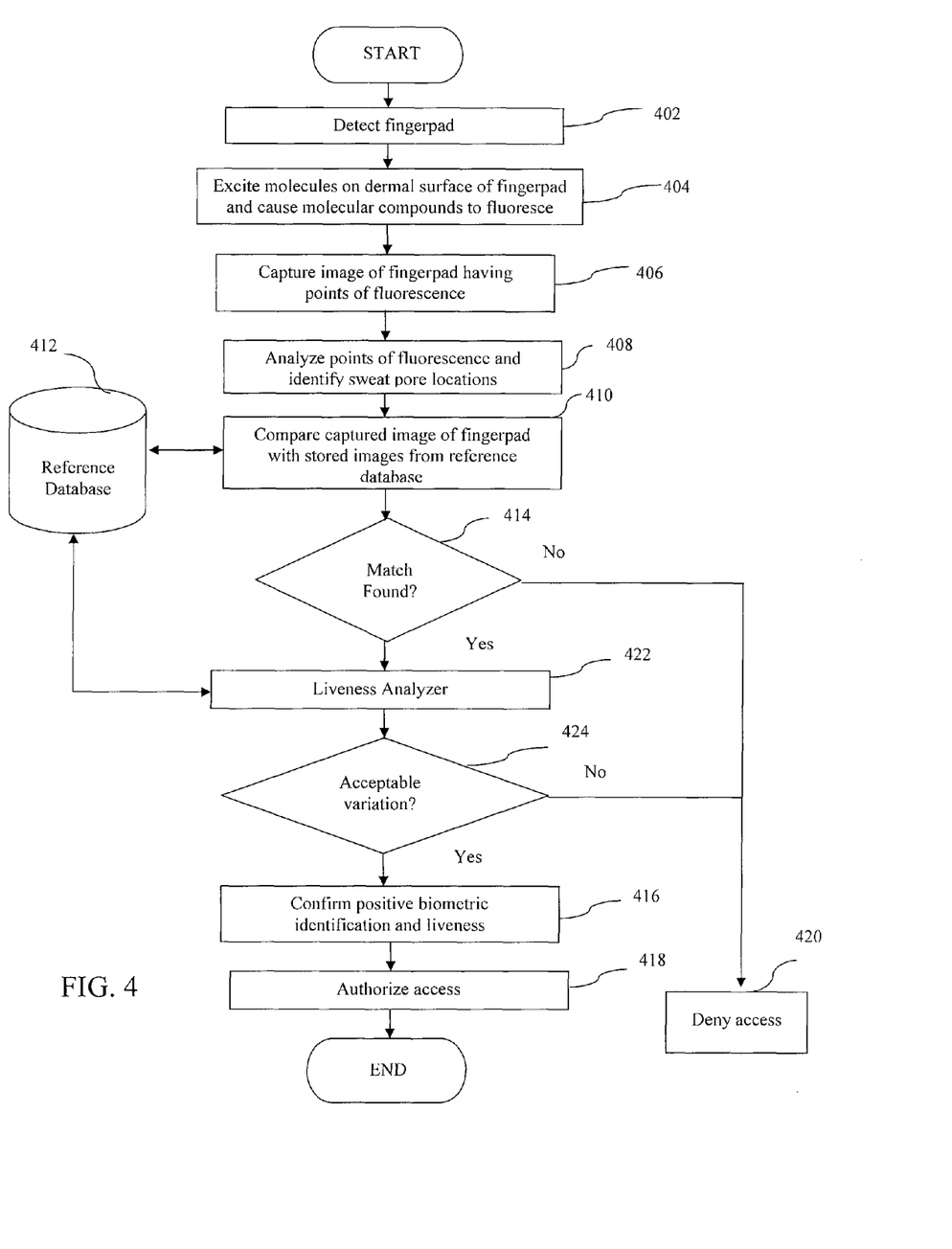
FIG. 4 is a flowchart illustrating an exemplary process for the detection and analysis of sweat pores for biometric identification and proof of liveness according to the present invention.

FIG. 4 provides a flowchart illustrating an exemplary process using sweat pore information as a biometric for identification and proof of liveness. The process shown in FIG. 4 may be implemented in a biometric identification and liveness system using, for example, the apparatus shown in FIG. 1.

As with the process illustrated in FIG. 3, the process starts by detecting a fingerpad on the top surface of a transparent electrode plate (step 402). Subsequent to detecting the fingerpad, a pulsed electrical charge stimulates and excites molecules associated with the dermal surface of the fingerpad causing the molecular compounds to fluoresce (step 404). Then an image capture device obtains an image derived from the fluoresced biological points (step 406).

Next the image is analyzed to identify sweat pore locations on the fingerpad (step 408) and the identified sweat pore locations are compared with reference sweat pore data stored on a database (step 410). Then a determination is made (step 414) if the identified sweat pore locations match an entry on the database. If no match is found, (no output of step 414), the process proceeds to step 420. If a match is found (yes output of step 414), the process proceeds to step 422.

In one embodiment, step 422 uses an algorithm to compare the sweat pore data detected from the individual and the matching reference database sweat pore data to determine the degree of variation therebetween. The variation analyzed by the algorithm may include the intensity or brightness of the fluorescence of one or more sweat pores, the size or shape of the sweat pores, and even the ability to detect the presence of one or more specific sweat pores. Alternatively, the liveness analyzer algorithm may compare past detected sweat pore data maintained in a reference database for the identified individual with the detected sweat pore data to determine the degree of variation therebetween. Or the liveness analyzer algorithm may compare successive contemporaneous detected sweat pore data to determine the degree of variation therebetween. Proof of liveness is established where there is at least some minimal variation in the compared sweat pore data. The lack of any variation would indicate an artificial biometric sample and yield a no output in step 424.

In addition, certain variations in an individual's detected sweat pores can be used as an indicator of the individual's emotional or physical state. For example, even if an individual biometric identification is verified or authenticated, the detected biometric information based on variation of sweat pore biometric information may be useful for identifying individuals who may be experiencing emotional, psychological or even physical distress. This information may be particularly useful for identifying individuals who may present potential security threats. Alternatively, this information may be useful to identify individuals who may be in need of immediate medical attention.

In another embodiment of the invention, the biometric identification apparatus is designed to detect the sweat pores along with a second biometric such as a fingerprint to enhance biometric identification reliability. Indeed, the unique method of stimulating the molecules associated with the fingerpad and causing molecular compounds to fluoresce in accordance with the present invention also enables the simultaneous detection of sweat pore and fingerprint biometric information. Specifically, the fluorescence of the molecular compounds not only creates biological points which identify the location of sweat pores, but also illuminates the fingerprint for image capture.

Figure 5:
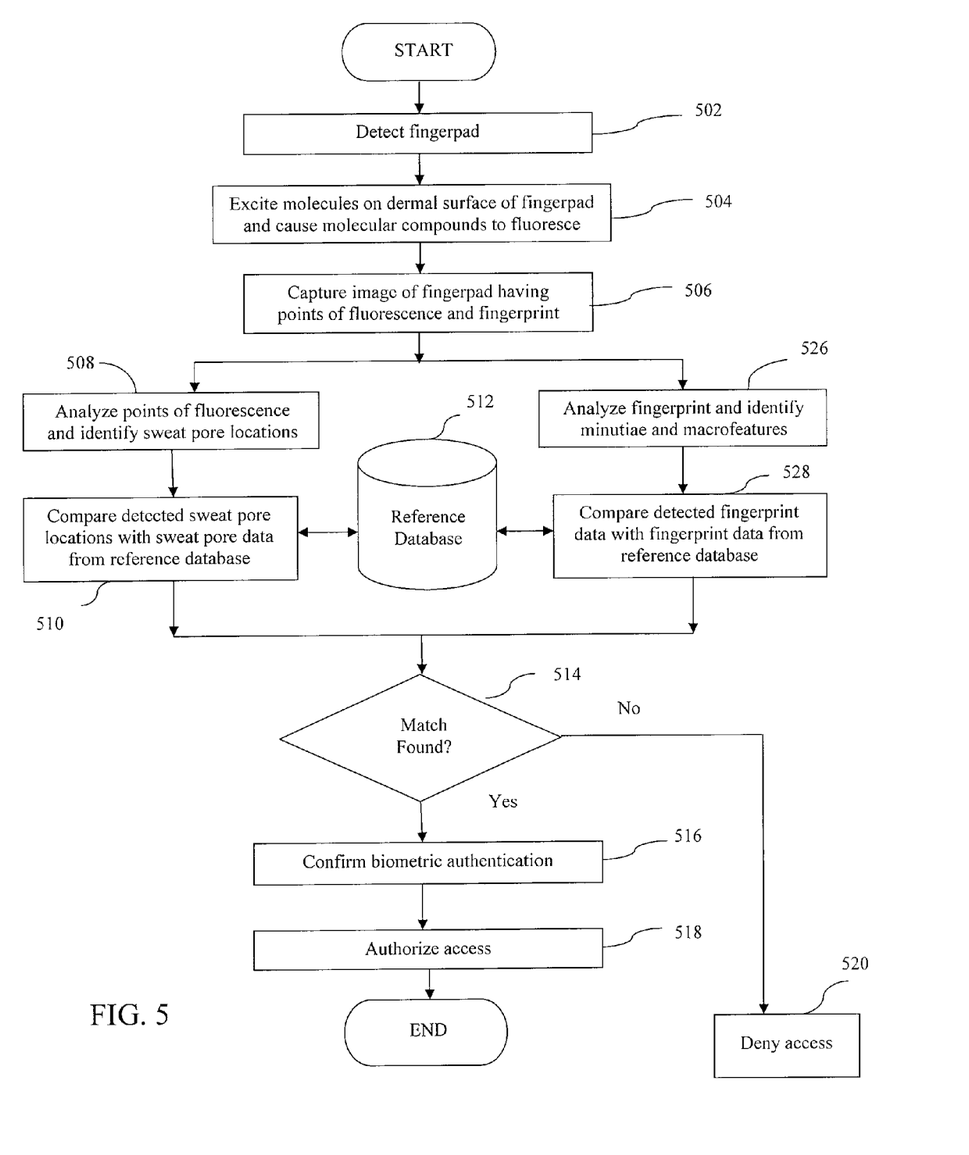
FIG. 5 is a flowchart illustrating an exemplary process for the detection and analysis of sweat pores and fingerprints for biometric identification according to the present invention.

FIG. 5 is a flowchart illustrating an exemplary process for detecting and analyzing sweat pore and fingerprint biometric information in accordance with the present invention. The process shown in FIG. 5 may be implemented in a biometric identification system using, for example, the apparatus shown in FIG. 1.

As described above with reference to the exemplary biometric identification process illustrated in FIG. 3, the process begins with the detection of a fingerpad on the top surface of the transparent electrode plate (step 502). Subsequent to the detection of the fingerpad, the electro-magnetic field generator 140 provides a pulsed electrical charge to stimulate and excite molecules associated with the dermal surface of the fingerpad and cause molecular compounds to fluoresce (step 504). An image capture device 150 then obtains an image of the fingerpad with the fluoresced biological points and illuminated fingerprint, such as shown in FIG. 2 (step 506).

Next the biometric identification system analyzes the sweat pore biometric information in the form of the fluoresced biological points and identifies sweat pore locations (step 508). The locations of the sweat pores may be identified by x- and y-coordinates on a two-dimensional matrix containing a reference point. Such a reference point, for example, may be a designated minutiae or macrofeature identified on the fingerprint captured by the image. Alternatively, the relative locations of the sweat pores may be identified by vector plot coordinates.

The detected sweat pore locations are then compared with reference sweat pore biometric information maintained in a secure database 512 (step 510). In parallel with these sweat pore detection and comparison steps, the process also performs a fingerprint identification step, wherein the fingerprint pattern from the captured image is analyzed to identify unique minutiae and macrofeatures (step 526). Next, the minutiae and macrofeatures are compared to reference fingerprint data stored in a secured database (step 528). Finally, a combined determination providing enhanced reliability is made based on an evaluation of the matches resulting from both the sweat pore and fingerprint biometric identification processes (step 514). Alternatively, the sweat pore and fingerprint biometric identification processes may occur in series with either the sweat pore biometric identification providing a preliminary determination subject to confirmation by fingerprint biometric identification or vice versa.

This embodiment may be further adapted to perform a third biometric measure based on the combined sweat pore and fingerprint biometric information. Specifically, the minutiae or macrofeatures contained in the fingerprint may be used to facilitate a mapping of the sweat pore locations yielding a combined fingerprint/sweat pore biometric.

The biometric identification information obtained by the present invention may also be used to create a unique biometric barcode identifier for each individual. This barcode may be created using one or more of the three biometric measures sensed by the present invention—sweat pore locations as identified by fluoresced biological points, fingerprint information (including ridge/valley patterns and minutiae/macrofeatures), and the locations of sweat pores relative to the fingerprint ridge/valley patterns and/or minutiae/macrofeatures.

As mentioned above, the fingerprint (ridge/valley patterns and minutiae/macrofeatures) and sweat pore locations on an individual's fingerpad are invariant throughout an individual's life and are generally considered fixed biometric measures. Accordingly, the locations of and spacing between the fingerprint ridges/valleys and minutiae/macrofeatures, as well as the locations of and spacing between sweat pores provide unique biometric measures for each individual. As disclosed above, in one embodiment the present invention yields an image derived from an individual's fingerpad containing both a fingerprint pattern and sweat pore locations identified by fluorescent biological points. According to the present invention, a biometric barcode may be created from a linear scan of the fingerprint biometric information and/or the sweat pore biometric information contained on the captured image.

More specifically, a linear scan of the image in a reference direction including a reference point may be reduced to binary data as a function of the position across the individual's fingerpad. For example, a linear scan of the sweat pore location information on the fingerpad image yields a signal with maxima and minima which correspond to fluoresced and non-fluoresced points on the image. The fluoresced points represent sweat pore locations and the non-fluoresced points represent space on the fingerpad between sweat pores. These maxima and minima are then reduced to a binary ONE or ZERO, respectively. This binary data can be further reduced to a series of lines and spaces of known widths to create a first unique barcode representative of the relative locations of sweat pores along the linear scan of the image. In this same manner, a second unique barcode identifier representative of the fingerprint ridge/valley pattern and/or minutiae/macrofeature locations may be derived from a linear scan of the image in a reference direction including a reference point. In addition, a third unique barcode identifier based on the combined fingerprint pattern and sweat pore locations on a fingerpad may be created from a linear scan of the image derived from the fingerpad. Each of these unique barcodes are referred to as a one-dimensional bar code since they are representative of a single biometric measure.

In addition to these three one-dimensional barcodes, any two of these barcodes may be combined to provide a two-dimensional barcode derived from two different biometric measures. Further, all three of these barcodes may be combined to provide a three-dimensional barcode derived from all three of the biometric measures.

These barcode identifiers may be used in a myriad of different ways with the biometric identification or authentication systems of the present invention. For example, these aspects of the invention may be used for verifying and authenticating an individual's identity in connection with commercial air travel. To this end, the process illustrated in FIG. 3 may be used to confirm that the passenger is approved for travel (i.e., not on a no-fly list). In order to obtain a ticket, the passenger must be authorized to travel via the process illustrated in FIG. 3. If authorized, the passenger's biometric barcode will be printed on the ticket. Next, in order to board the plane, the passenger must be authenticated using the process illustrated in FIG. 6. First, the passenger must present the ticket with the biometric barcode. Then the passenger's biometric identity must match the biometric identity associated with the barcode on the ticket. In addition, if the passenger checks luggage on the aircraft, the passenger's biometric barcode will be printed on each baggage tracking label. This will facilitate the retrieval of the passenger's checked baggage from the aircraft in the event the passenger doesn't board the aircraft or is denied boarding the aircraft. In addition, the barcode on the baggage tracking label may also be used at the baggage claim site to prevent unauthorized individual's from taking a passenger's luggage.

The biometric identification and barcode aspects of the present invention may also be used by mail delivery or courier services for assigning an individual's identity to a package or letter. In this regard, the biometric identification system and barcode enable the delivery or courier service to identify the individual who shipped a package or letter. As will be appreciated, this will function as a strong deterrent against the use of mail delivery or courier services for the shipment of illegal materials, including explosives or illicit drugs.

According to a further aspect of the present invention, an individual's biometric identification may be represented by an audio signal based on a combination of multiple pitches of notes on a music scale. For example, a combination of 25 different pitches of notes on musical scale for a piano may be used to create a unique biometric audio signal for an individual. The specific combination and order of the pitches of notes corresponds to biometric identification information sensed by the present invention. Alternatively, the biometric audio signal may be derived from an individual's barcode identifier. This biometric audio signal may be used as the audio signal broadcast to confirm positive biometric identification according to the optional feature of step 316 of the process illustrated in FIG. 3.

The present invention may also be adapted to detect and analyze the composition of the sweat contained in or secreted from an individual's sweat glands. To this end, the top surface of the transparent electrode may be coated with a transparent film that is designed to detect certain components in an individual's sweat. For example, it is known that sweat contains an individual's DNA fragments which may be detected and used as another source of biometric identification information. In addition, it is also known that sweat contains chemical compositions indicative of substances ingested by an individual such as alcohol or drugs (prescription or illicit). Moreover, the amounts of detected compositions in an individual's sweat may be indicative of the prevailing amount of alcohol or drugs in the individual's blood stream. Therefore, for example, the detection of an amount of a particular substance in an individual's sweat may be used to determine if the individual has a blood alcohol content exceeding a permissible limit. Similarly, this detection system may be used to determine if an individual is under the influence of an illicit drug. By way of further example, the detection of a substance indicative of the presence or level of a prescription drug in the individual's blood stream may be useful as a non-invasive method of determining whether an individual has a particular medical condition that merits attention.

Further, the present invention may be adapted to detect and analyze the composition of the sweat secreted from an individual's sweat pores for medical diagnostic purposes. For example, the chemical composition or temporal variation in the chemical composition of an individual's sweat may be indicative of the individual's health condition, including whether the individual has contracted a disease or illness.

Moreover, the present invention may be adapted to detect and analyze the residual material or substances on an individual's dermal surface. To this end, the top surface of the transparent electrode may be covered with a transparent film which is designed to detect the existence of certain substances residing on the individual's dermal surface. For example, the transparent film may be used to detect any residual explosives material on an individual's fingers or palms. This information could be particularly useful for identifying individuals who may present potential security threats.

With regard to each of the detection systems for indicators based on the composition of the sweat or residual material or substances on the individual's dermal surface, the apparatus of FIG. 1 may be adapted to include a display screen for viewing by a security agent.

The biometric identification system of the present invention is particularly useful in a mobile system comprising a portable biometric identification detection device coupled via a communication network with a central database. To this end, the portable device may comprise a network communication interface for communicating with the central database. Alternatively, the portable device may comprise an external communication interface configured to communicate with a network device (such as a personal computer) having a network communication interface. The external communication interface may be a serial communication interface such as a universal serial bus or a wireless communication interface such as Bluetooth protocol.

Figure 6:
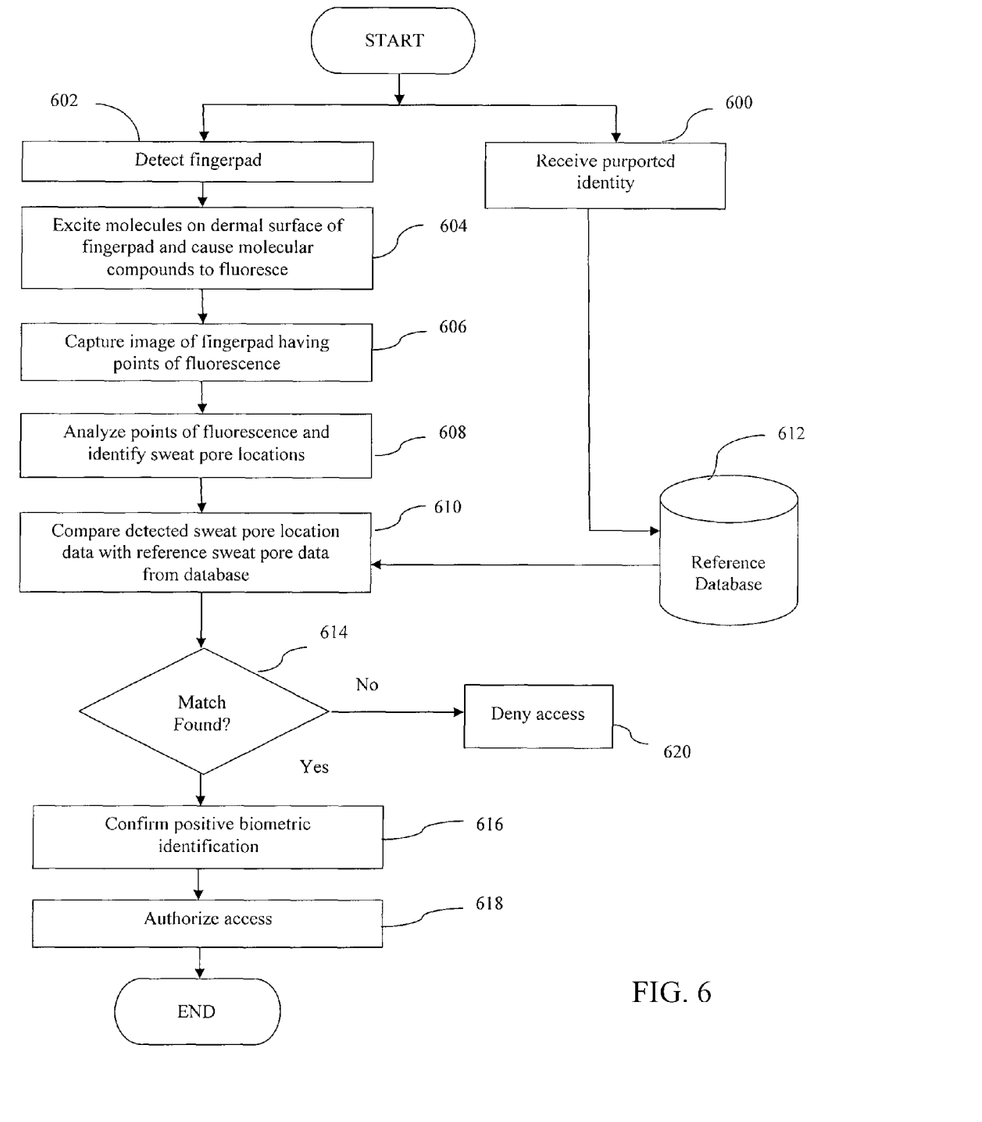
FIG. 6 is a flowchart illustrating an exemplary authentication process based on the detection and analysis of sweat pores with in accordance with the present invention.

The present invention may also be used as a biometric authentication system for verifying the purported identity of an individual. FIG. 6 is a flowchart illustrating an exemplary biometric authentication process based on the detection and analysis of sweat pores in accordance with the present invention. The process shown in FIG. 6 may be implemented in a biometric system using, for example, the apparatus shown in FIG. 1.

The process begins when the apparatus receives an alleged identity from the subject individual (step 600). This step can be implemented where, for example, the subject individual presents an identification badge, passport, credit card, bank ATM card, VPN token or any other source of identification to a reader, scanner or any other device configured to receive identification information from the identification source. The authentication process may take place in situ where the biometric authentication apparatus itself comprises a reference identification database and performs the authentication process. Alternatively, the authentication system may comprise a remote server configured to perform the authentication process and/or a remote database containing reference biometric identification information, wherein the server and/or database reside, for example, on a LAN, WAN or the Internet. For example, with regard to identification sources such as a credit card, bank ATM card or VPN token, the biometric authentication system may comprise a computer device having a network interface configured to communicate via a network, such as a LAN, WAN or the Internet, with a remote server and central database.

The process also proceeds from steps 602 to 608 in the same manner as described above with regard to the process illustrated in FIG. 3. As shown in FIG. 6, the purported identity information is inputted to the secure database 612, which in turn, submits reference biometric identification data for comparison with the detected sweat pore biometric data (step 610). After comparing the detected sweat pore biometric information with the stored reference biometric information, a determination is made as to whether the detected sweat pore biometric information matches the reference biometric identification data (step 614). If no match is found (no output of step 614), the process proceeds to step 620. If a match is found (yes output of step 614), the process proceeds to step 616 where an indicator is provided confirming a positive biometric authentication. Such an indicator is an optional feature of the invention and may include a visual display and/or an audio signal. The process then proceeds to step 620 where the biometric authentication system authorizes access to a secure area or device.

Thus, having described several embodiments, it will be recognized by those skilled in the art that various modifications, alternative configurations, and equivalents may be used in connection with the practice of the present invention. For example, the biometric identification and authentication processes of the exemplary embodiments illustrated in FIGS. 3-6 provide for authorized access to a secure area or device upon successful biometric identification or authentication. However, it will be understood that these processes may also be used in other contexts, including authorization for a commercial credit transaction or banking transaction. With regard to a commercial credit transaction, for example, the biometric identification and liveness process illustrated in FIG. 4 may be modified such that step 418 authorizes the execution of a commercial credit transaction involving an individual's online account. In this example, step 418 would involve transmitting a communication to a secure database authorizing a credit transaction for a specific account. The communication may be encoded with the individual's biometric data obtained from either the captured fingerpad image or the matching entry from the reference database for identifying the individual's account on the secure database. Such a system would circumvent many of the most prevalent identify theft issues as it would eliminate the need for an individual to present a credit card account number and use signature authorization. In addition, the written receipt confirming this transaction and the purchased product may be linked together by labeling or stamping each with the purchaser's identification bar code. This use of the individual's identification bar code may function as a theft deterrent system for a retailer and it may also function to confirm the authenticity of the original transaction in connection with the return of a product to the retailer for refund or exchange.

What is claimed is:

1. An apparatus for obtaining biometric information from an individual's dermal surface, comprising:
    (a) a first device configured to generate an electrical charge, wherein the electrical charge is configured to stimulate molecules in the vicinity of the individual's dermal surface and cause compounds in the stimulated molecules to fluoresce;
    (b) a second device configured to capture an image of the dermal surface derived from the fluoresced molecular compounds; and
    (c) a transparent substrate dimensioned to receive the individual's dermal surface, wherein the transparent substrate comprises an electrical conductor disposed in communication with the first device configured to generate an electrical charge.

2. The apparatus according to claim 1, wherein the first device is configured to generate a pulsed electrical charge within a range of from about 1 to 25 volts and at intervals of at least 1 pulse per second.

3. The apparatus according to claim 1, wherein the first device is configured to generate a pulsed electrical charge of about 1 to 2 volts and at intervals of from about 5 to 10 pulses per second.

4. The apparatus according to claim 1, wherein the first device is configured to generate a pulsed electrical charge of from about 1 to 6 volts and at intervals of at least about 5 pulses per second.

5. The apparatus according to claim 1, wherein the first device comprises a light impulse generator.

6. The apparatus according to claim 1, wherein the first device comprises an acoustic pressure generator.

7. The apparatus according to claim 1, wherein the second device is a CCD array camera.

8. The apparatus according to claim 1, wherein the transparent substrate comprises:
    (a) a transparent glass plate having a top surface and a bottom surface; and
    (b) a transparent current conductive layer on the bottom surface of the transparent glass plate, wherein the transparent current conductive layer is coupled in communication with the first device.

9. The apparatus according to claim 8, wherein a layer of transparent polymer material is disposed on the top surface of the transparent glass plate.

10. A method for biometric identification based on biometric information sensed from an individual's dermal surface, comprising the steps of:
    (a) receiving an individual's dermal surface on a transparent substrate comprising an electrical conductor;
    (b) generating an electrical charge in the electrical conductor to stimulate molecules in the vicinity of the individual's dermal surface and cause compounds in the stimulated molecules to fluoresce;
    (c) capturing an image derived from the dermal surface having fluoresced molecular compounds; and
    (d) identifying biometric information derived from the image.

11. The method of claim 10, wherein the electrical charge comprises a pulsed electrical charge.

12. A method for biometric authentication based on biometric information sensed from an individual's dermal surface, comprising the steps of:

(a) receiving a purported identity for the individual;
(b) receiving an individual's dermal surface on a transparent substrate comprising an electrical conductor;
(c) generating an electrical charge in the electrical conductor to stimulate molecules in the vicinity of the individual's dermal surface and cause compounds in the stimulated molecules to fluoresce;
(d) capturing an image derived from the dermal surface having fluoresced molecular compounds;
(e) identifying biometric information derived from fluoresced points detected on the image;
(f) comparing identified biometric information derived from the image with reference biometric information for the purported identity;
(g) determining whether a match is found between the identified biometric information derived on the image and the reference biometric information for the purported identity; and
(h) responsive to determining that the match is found, making a positive biometric authentication.

13. A method for establishing liveness of a biometric subject, comprising the steps of:
(a) receiving an individual's dermal surface on a transparent substrate comprising an electrical conductor;
(b) generating an electrical charge in the electrical conductor to stimulate molecules in the vicinity of the biometric subject dermal surface and cause compounds in the stimulated molecules to fluoresce;
(c) capturing an image derived from the dermal surface having fluoresced molecular compounds;
(d) identifying sweat pores derived from fluoresced points detected on the image;
(e) analyzing characteristics of the identified sweat pores and comparing the characteristics of the identified sweat pores with corresponding reference sweat pore characteristics; and
(f) determining whether there is at least some minimal variation between the characteristics of the identified sweat pores and the characteristics of the corresponding reference sweat pores.

14. The apparatus according to claim 1, wherein the first device comprises a voltage source.

15. The method of claim 10, further comprising the steps of:
(a) comparing identified sweat pore locations derived from the image with reference sweat pore location data;
(b) determining whether a match is found between the identified sweat pore locations derived from the image and the reference sweat pore location data; and
(c) responsive to determining that the match is found, making a positive biometric identification.

16. The method of claim 13, further comprising the step of responsive to determining that sufficient minimal variation is found, confirming liveness of the biometric sample.

* * * * *